(12) United States Patent
Zhang et al.

(10) Patent No.: US 9,342,279 B2
(45) Date of Patent: May 17, 2016

(54) TRACEABILITY MANAGEMENT FOR ALIGNING SOLUTION ARTIFACTS WITH BUSINESS GOALS IN A SERVICE ORIENTED ARCHITECTURE ENVIRONMENT

(75) Inventors: Liang-Jie Zhang, Cortlandt Manor, NY (US); Yi-Min Chee, Yorktown Heights, NY (US); Teresa Abdel-Hamid, Columbus, OH (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1333 days.

(21) Appl. No.: 12/496,881

(22) Filed: Jul. 2, 2009

(65) Prior Publication Data

US 2011/0004499 A1 Jan. 6, 2011

(51) Int. Cl.
*G06F 9/44* (2006.01)
*G06Q 10/00* (2012.01)
*G06Q 10/06* (2012.01)

(52) U.S. Cl.
CPC .. *G06F 8/36* (2013.01); *G06F 8/10* (2013.01); *G06Q 10/06375* (2013.01)

(58) Field of Classification Search
USPC .................. 705/1.1, 7.37, 342; 717/108, 120
See application file for complete search history.

(56) References Cited

U.S. PATENT DOCUMENTS

| 7,197,740 | B2* | 3/2007 | Beringer | G06F 8/36 717/108 |
| 7,322,024 | B2* | 1/2008 | Carlson | G06F 8/36 707/999.103 |
| 7,823,125 | B2* | 10/2010 | Batabyal | 717/120 |
| 7,881,920 | B2* | 2/2011 | Abu El Ata et al. | 703/22 |
| 7,885,793 | B2* | 2/2011 | Padmanabhan | 703/2 |
| 7,958,494 | B2* | 6/2011 | Chaar et al. | 717/121 |
| 7,979,840 | B2* | 7/2011 | Zhang et al. | 717/104 |
| 2007/0185657 | A1* | 8/2007 | Lacy et al. | 702/19 |
| 2007/0223396 | A1* | 9/2007 | Bertram et al. | 370/254 |
| 2007/0240102 | A1* | 10/2007 | Bello et al. | 717/104 |
| 2008/0127047 | A1* | 5/2008 | Zhang et al. | 717/104 |
| 2008/0282219 | A1* | 11/2008 | Seetharaman et al. | 717/101 |
| 2008/0294408 | A1* | 11/2008 | Padmanabhan | 703/13 |

(Continued)

OTHER PUBLICATIONS

Iaon Salomie, "Model and SOA Solutions for Traceability in Logistic Chains." iiWAS 2008 Proceedings. http://dl.acm.org/citation.cfm?id=1497370.*

(Continued)

*Primary Examiner* — Lynda Jasmin
*Assistant Examiner* — Johnathan Lindsey, III
(74) *Attorney, Agent, or Firm* — Yee & Associates, P. C.; Louis J. Percello

(57) ABSTRACT

Traceability management to align IT solution artifacts with business goals in a service oriented architecture environment is provided. A pattern matching framework is provided for generating patterns and transformation enablers for architectural artifacts based on specific business requirements. Patterns that are applicable to a selected set of artifacts or model are provided to an architect, who may then select a particular subset of the patterns to apply to the set of artifacts or model in the SOA solution design to speed up and simplify the design process. Providing applicable or candidate patterns for selection to the architect in the views reduces the possible ambiguity in architectural artifact-pattern matching and selection. These solution patterns may be used as a guide when configuring and linking architectural artifacts and models.

15 Claims, 9 Drawing Sheets

(56) References Cited

U.S. PATENT DOCUMENTS

| | | | |
|---|---|---|---|
| 2009/0064087 A1* | 3/2009 | Isom ............................. | 717/101 |
| 2009/0113289 A1* | 4/2009 | Zhang ................... | G06F 17/211 |
| | | | 715/239 |
| 2009/0158237 A1* | 6/2009 | Zhang et al. ................. | 717/100 |
| 2009/0222429 A1* | 9/2009 | Aizenbud-Reshef et al. .... | 707/5 |
| 2009/0313335 A1* | 12/2009 | Heidasch ..................... | 709/206 |
| 2010/0017783 A1* | 1/2010 | Brininstool et al. .......... | 717/101 |
| 2010/0030890 A1* | 2/2010 | Dutta et al. .................. | 709/224 |
| 2010/0125618 A1* | 5/2010 | Dutta et al. .................. | 707/822 |
| 2010/0138250 A1* | 6/2010 | Brown et al. ..................... | 705/7 |
| 2010/0153163 A1* | 6/2010 | Peltz et al. ........................ | 705/9 |
| 2010/0157822 A1* | 6/2010 | Ivanov et al. ................ | 370/252 |
| 2010/0257522 A1* | 10/2010 | Malamud et al. ............. | 717/176 |
| 2011/0219354 A1* | 9/2011 | Zhang et al. ................. | 717/104 |
| 2012/0210292 A1* | 8/2012 | Zhang et al. ................. | 717/104 |

OTHER PUBLICATIONS

U.S. Appl. No. 12/496,881 EIC 3600 Search Report.*

* cited by examiner

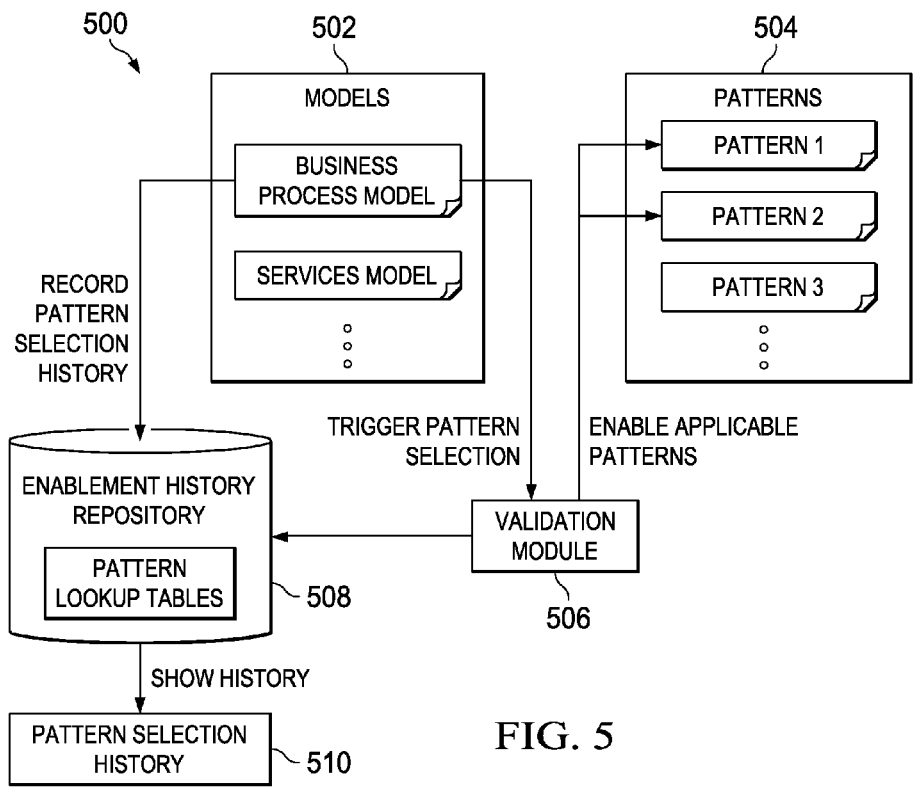
FIG. 5
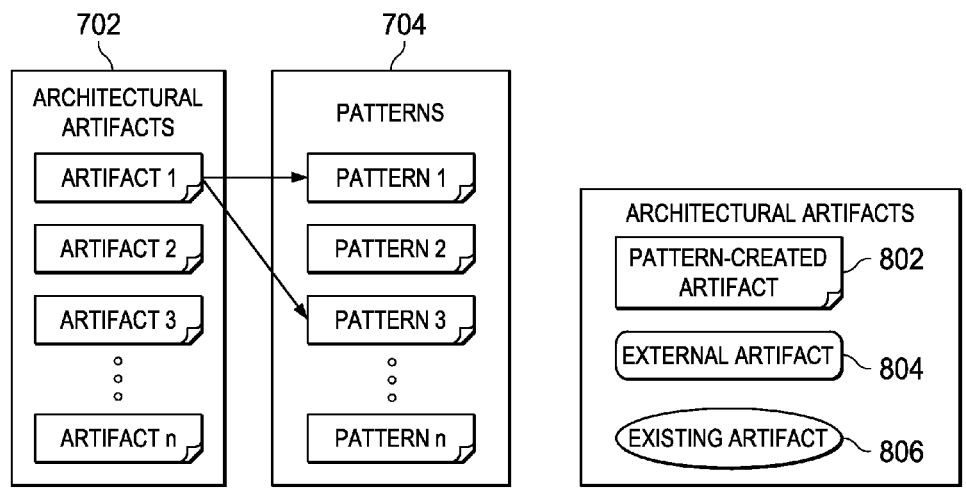
FIG. 7
FIG. 8

FIG. 13

1302 — IMPACT.=CandidateService: : Function: : FunctionalArea: : Domain: : BusinessGoal: : Process: : ExistingAsset
1304 — IMPACT.Indirect.Leaf=Domain: : BusinessGoal: : Process: : ExistingAsset
IMPACT.Direct.Leaf=Service
1306 — IMPACT.Direct.Leaf=ServiceComponent 1308 {
IMPACT.Indirect.CandidateService.Dependency.Stereotype=CandidateServiceOrigin
IMPACT.Indirect.CandidateService.Dependency=Function: : BusinessGoal: : Process: : ExistingAsset IMPACT.Indirect.Function.Package=FunctionalArea
IMPACT.Indirect.FunctionalArea.Package=Domain
IMPACT.Indirect.BusinessGoal.Owner=BusinessGoal
IMPACT.Indirect.Process.Process=Process
IMPACT.Indirect.Service.Dependency=CandidateService: : Service
IMPACT.Indirect.ServiceComponent.ClientDependency=Service IMPACT.Direct.Domain.Package=FunctionalArea
IMPACT.Direct.FunctionalArea.Package=Function
IMPACT.Direct.Function.Dependency=CandidateService
IMPACT.Direct.Function.Dependency.Stereotype=CandidateServiceOrigin IMPACT.Direct.Process.Dependency=CandidateService
IMPACT.Direct.Process.Dependency.Stereotype=CandidateServiceOrigin
IMPACT.Direct.ExistingAsset.Dependency=CandidateService
IMPACT.Direct.ExistingAsset.Dependency.Stereotype=CandidateServiceOrigin
IMPACT.Direct.BusinessGoal.Owner=BusinessGoal IMPACT.Direct.Function.Dependency=CandidateService
IMPACT.Direct.Function.Dependency.Stereotype=CandidateServiceOrigin
IMPACT.Direct.Function.Dependency.Folder=1. Identification: :1.4 Service Portfolio
}

← 1300

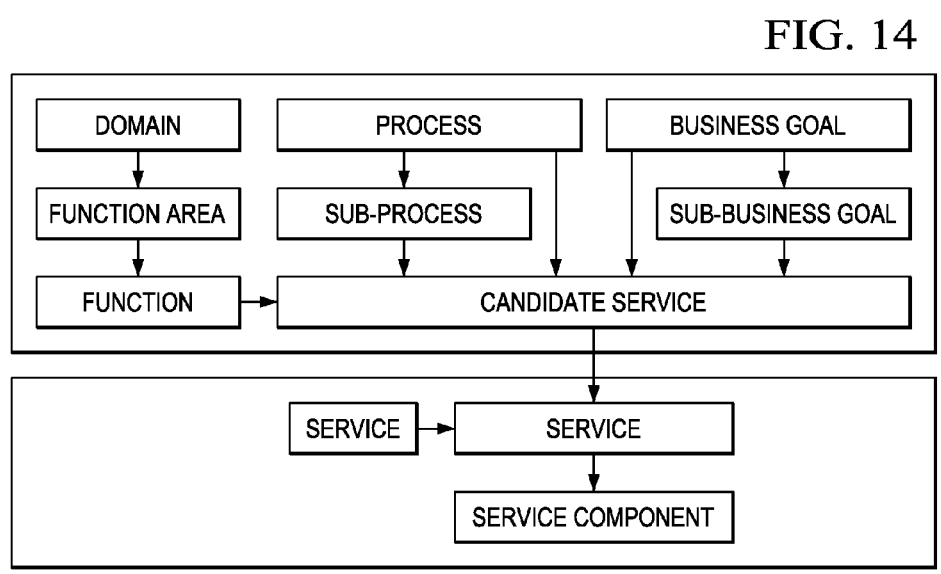

FIG. 14

TRACEABILITY MANAGEMENT FOR ALIGNING SOLUTION ARTIFACTS WITH BUSINESS GOALS IN A SERVICE ORIENTED ARCHITECTURE ENVIRONMENT

BACKGROUND

1. Field

The disclosure relates generally to an improved data processing system, and more specifically to traceability management for aligning information technology (IT) solution artifacts with business goals in a service oriented architecture environment.

2. Description of the Related Art

Service Oriented Architecture (SOA) is an extensible architectural framework at the programming and middleware level, business process level, and enterprise level comprising a set of business-aligned services that are combined (composed and choreographed) to fulfill business goals. SOA consulting services help customers solve business problems by developing SOA principles and best practices that guide planning, development, integration, and management of application infrastructures. Currently, most SOA consulting services are conducted in an ad-hoc and labor intensive way due to disparate methods, tools, and solution content. For example, existing techniques for providing traditional consulting services concentrate on application-specific areas or industry-specific areas. Documentation-based consulting practices have resulted in a challenge of standardizing a design approach for various solution creation scenarios. With paper-based services delivery practices, solution artifacts created in one scenario may not be able to be widely reused or quickly adapted to various types of industry solutions.

SUMMARY

The illustrative embodiments provide a computer implemented method, apparatus, and computer program product for enabling traceability management for aligning IT solution artifacts with business goals in a service oriented architecture environment. Solution design patterns may be generated through a process of pattern identification, pattern storage, and pattern reusage from architecture design practices. A service oriented architecture specification may then be derived from the captured set of business requirements, wherein the service oriented architecture specification defines service oriented architecture practices that achieve a set of business objectives in accordance with the business requirements. A set of architectural artifacts and their attributes and constraints are obtained from the service oriented architecture specification. A set of architectural artifacts may comprise one or more (a group of) architectural artifacts. Solution design pattern rules for the set of architectural artifacts are derived, wherein the solution design pattern rules define transformation relationships among the set of architectural artifacts and define the attributes and business constraints of the set of architectural artifacts. Transformation enabler rules for the set of architectural artifacts are derived, wherein the transformation enabler rules define actions to be applied to the set of architectural artifacts to transform the set of architectural artifacts to another set of architectural artifacts. Solution design patterns and transformation enablers applicable to the design solution are then generated based on the respective solution design pattern rules and transformation enabler rules.

BRIEF DESCRIPTION OF THE SEVERAL VIEWS OF THE DRAWINGS

FIG. 5 is a diagram of a pattern matching framework in accordance with the illustrative embodiments;

FIG. 7 is a diagram illustrating the flagging of artifact-pattern matches in accordance with the illustrative embodiments;

FIG. 8 is a diagram illustrating source flagging of architectural artifacts in accordance with the illustrative embodiments;

FIG. 13 illustrates an exemplary encoding of patterns which define the impact scope of an architecture building block for an SOA solution model in accordance with the illustrative embodiments;

FIG. 14 illustrates a graphical representation of the encoding in FIG. 13 in accordance with the illustrative embodiments.

DETAILED DESCRIPTION

Figure 1:
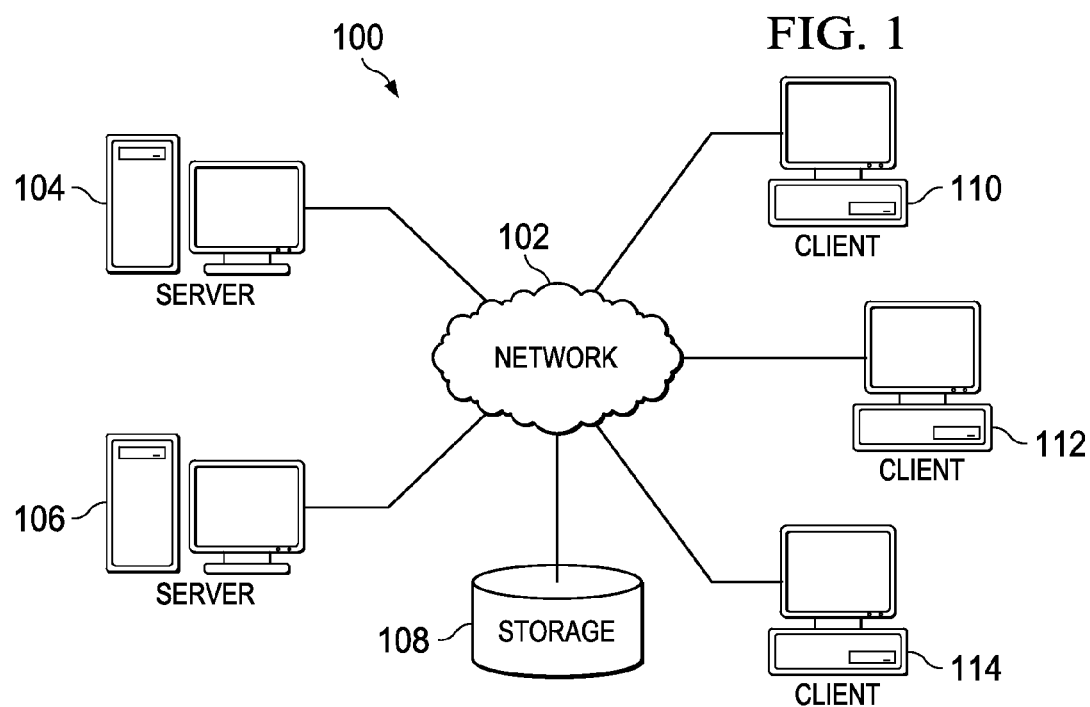
FIG. 1 depicts a pictorial representation of a network of data processing system in which illustrative embodiments may be implemented.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems) and computer program products according to embodiments of the disclosure. It will be understood that each block of the flowchart illustrations and/or lock diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
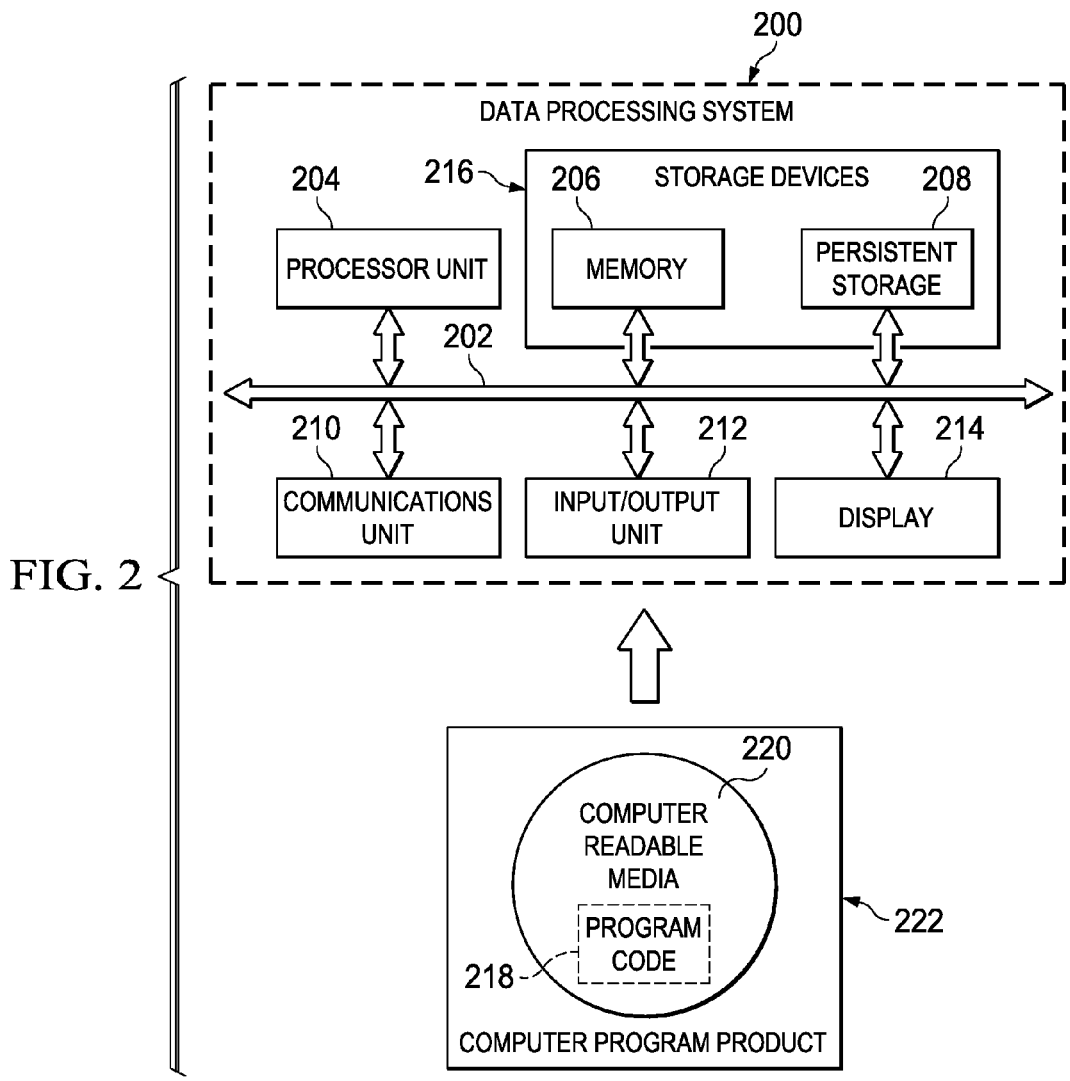
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer readable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The role of a solution architect is to evaluate a business problem and associated business requirements to identify and design a solution to the problem. The solution may be provided as a service to customers, investors, partners, vendors, and the like. To enhance the solution building process, the design knowledge that each solution architect gains during the design process may be captured and reused by subsequent architects, thereby reducing the time, money, and effort when building future solutions.

The illustrative embodiments provide a systematic way to allow architects that are designing a solution to a business problem to generate and apply this reusable design knowledge to selected architectural artifacts or models. The reusable design knowledge is captured as solution patterns that are used as a guide to determine and configure the architectural artifacts and models that comply with industry standards or best practices. A solution pattern is defined as a template for handling recurring design issues that arise in particular contexts and domains. A solution pattern comprises a set of reusable architectural artifacts (comprising the smallest architectural building blocks (ABBs) of a solution) and their relationships or linkages to one another. In this disclosure, the term 'architectural artifacts' may be used interchangeably with the term 'architectural building block'. In an service oriented architecture solution, architectural artifacts may include, but are not limited to, Business Domain, Functional Area, Function, Business Process, Metric, Key Performance Indicator (KPI), Existing Asset, Candidate Service, Composite Service, Service, Service Component, Functional Component, Technical Component, and Component Flow. Solution patterns provide a reusable way to capture the transformation relationships and attributes of a specific architectural artifact or a set of artifacts, and may be designed to meet most common customer requirements. For example, a service allocation pattern is a template for enabling a service artifact to be allocated to a corresponding service component artifact, which is to implement the interface and functions designed for the service artifact. In another example, a message specification pattern provides a template for defining message types, sources, and message formats. The message types include input and output message types, the sources may be local files (e.g., XML schema files) or URLs (e.g., an industry standard-based XML schema files hosted on Web sites); the message formats may be of a string, integer, or complex type. In this case, the message specification is a typical solution pattern that can provide a predefined template for a service to use when defining industry standard compliant messages. The patterns leverage the experience of solution architects, such that other architects may use the patterns to create solutions quickly, whether for a small local business or a large multinational enterprise. From a representation perspective, a solution pattern may be captured using unified modeling language (UML) modeling constructs, an extensible markup language (XML) document, or a graph.

In one aspect of the illustrative embodiments, a pattern matching framework is provided for applying patterns and transformation enablers for architectural artifacts based on specific business requirements. The framework comprises two major components: solution patterns and transformation enablers. The solution patterns are reusable enablement templates that are used to implement the transformation relationships between architectural artifacts. The solution patterns are implemented as software components that facilitate required actions based on pre-defined specifications and rules. Thus, individual patterns also record their compliance with guidelines (organizational, industry-specific, or project-specific) that must be followed. A transformation enabler is a set of transformations triggered by a context-aware menu action specific to an artifact. When triggered, the action results in a transformation of the current artifact to another artifact (e.g., from a candidate service to an identified service), or a build up of certain transformation relationships among the artifacts. Transformation enablers may comprise menu items in a graphical user interface environment and are applied as actions to specific architectural artifacts in order to facilitate the transformations between architectural artifacts in order to build an architecture model. A service oriented architecture consulting service may be provided to customers comprising the solution design patterns and transformation enablers to facilitate solution design support. The service oriented architecture consulting service may provide support across various and/or disparate businesses and industry environments.

In another aspect of the illustrative embodiments, a multi-dimensional cascading flagging mechanism is provided that allows for the use of solution patterns as a guide when configuring and linking architectural artifacts (and models). The multi-dimensional aspect of the flagging mechanism refers to having multiple attributes associated with each architectural artifact. The cascading aspect of the flagging mechanism refers to the successive application of patterns to different sets of artifacts, where each application of a pattern modifies the state of the artifact attributes and flags. Cascading also refers to providing traceability for the artifacts. Flagging refers to defining attributes or status of an artifact, such as, for example, the origin or source of the artifact, the artifact completion status, or guidelines applied to the artifact. All patterns that are applicable to a selected artifact or model are provided to the architect, who may then select a particular subset of the patterns to apply to the artifacts or model in the service oriented architecture solution design to speed up and simplify the design process. A pattern may be applicable to an artifact or model based on the type or certain properties of artifact or model. For example, an artifact of a candidate service has a set of properties, such as, for example, application programming interfaces (APIs), performance constraints, and access controls. The type of the artifact may be used to determine whether or not a pattern is applicable to the artifact. Patterns may be applicable at the artifact(s) level or at the model level, wherein applicability is determined by the type(s) of artifacts or models. Pre-built patterns may also be applied to specific vertical industries, such as the health industry.

The multi-dimensional cascading flagging mechanism also provides multi-dimensional mapping of models and artifacts through cascading flag views. The views may include, for example, an artifact view, profile view, and compliance view, among others. Providing applicable or candidate patterns for selection to the architect in the views reduces the possible ambiguity in architectural artifact-pattern matching and selection. The views also provide the ability to manage and assess the existing architectural artifact portfolio in the context of design and implementation. An artifact source-shape categorizing mechanism is further provided to improve the productivity in service oriented architecture solution design by indicating the sources from where the architectural artifacts are derived.

Figure 3:
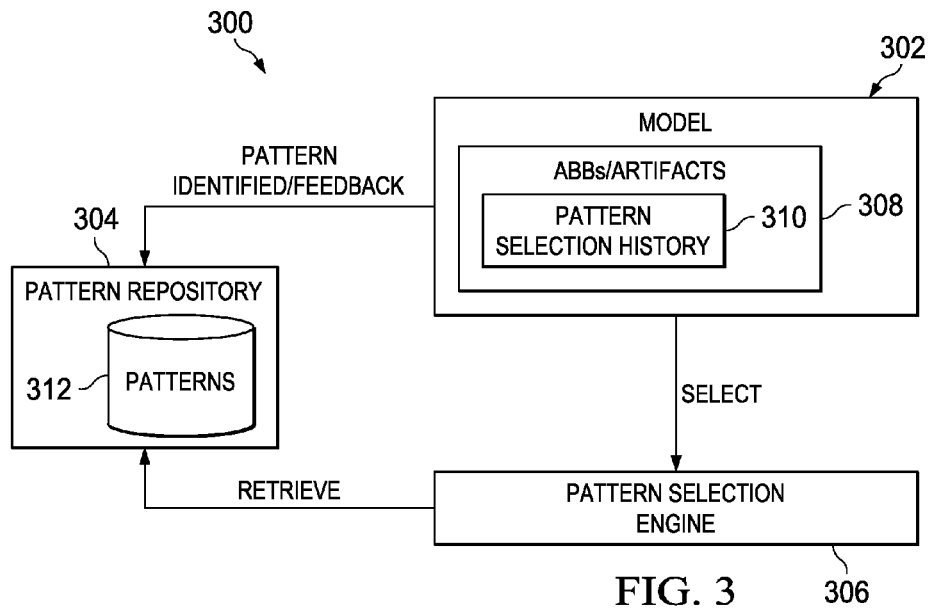
FIG. 3 is a block diagram of components in a solution design environment for implementing aspects of the illustrative embodiments.

FIG. 3 is a block diagram of components in a solution design environment for implementing aspects of the illustrative embodiments. Solution design environment 300 illustrates a cyclical relationship of components forming a life cycle of architecture solution pattern creation and solution pattern application to architecture building blocks (e.g., artifacts) to build an architectural model.

Solution design environment 300 comprises an architectural model 302, pattern repository 304, and pattern selection engine 306. Architectural model 302 is a representation of a subject of interest, including, for example, a whole or a part of an enterprise. Model 302 is populated with architecture building blocks 308 that are added to the model in multiple steps. An architecture building block is a constituent of architecture model 302 that describes a single aspect of the overall model. An architecture building block, or artifact, represents a potentially reusable business, IT, or architectural component that can be combined with other building blocks to deliver architectures and solutions. When adding an architecture building block to model 302 to build a solution, pattern selection engine 306 may be invoked to retrieve and display the possible architecture patterns that are applicable to the architecture building block type (stereotype). Thus, each pattern in pattern repository 304 is associated with an architecture building block type (or stereotype), or a set of building block types with associated relationships between the building block types. The order in which the patterns applicable to the architecture building block are displayed may be determined based on the history usage of the architecture patterns, such as displaying the patterns most often selected by solution architects higher in the list of applicable patterns. When a solution architect selects a particular pattern in the list of displayed patterns, the selected pattern may be stored in model 302 to form a pattern selection history 310 for the associated architecture building block. Pattern selection history 310 may be used in the multi-dimensional cascading flagging aspects of the disclosure. For a specific model, pattern selection history 310 may comprise the process of selecting certain patterns which are used to populate a model. Selected patterns may also be stored as patterns 312 in pattern repository 304 to be used as a history usage record of the patterns. In the pattern repository system, the pattern selection history is a history describing the selection and reuse of a specific pattern. This pattern selection history may be used to rank applicable patterns displayed to the architect in a graphical user interface according to pattern selection and reuse by other architects.

New architecture patterns may also be created by an architect when applicable patterns are not available for selection for the selected model or set of artifacts and stored in pattern repository 304. In most circumstances, there may be a certain number of pre-populated architecture patterns already existing in the pattern repository system. However, a new architecture pattern is needed in situations in which no existing patterns are applicable enough for the selected model or set of artifacts. In this situation, an architect (typically a senior architect) may create new architecture patterns by specifying a set of artifacts and their relationships with the guidelines of applying this pattern. The new architecture patterns are then validated through the ranking and selection of the new pattern by other architects, as described further in FIG. 5.

Figure 4:
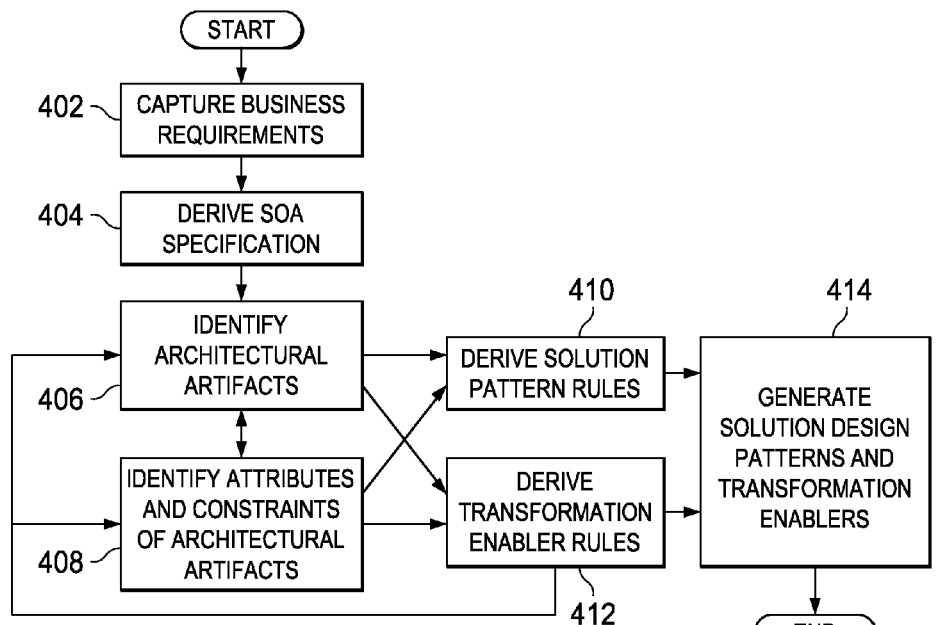
FIG. 4 is a flowchart of a process for generating patterns and transformation enablers in accordance with the illustrative embodiments.

FIG. 4 is a flowchart of a process for generating patterns and transformation enablers in accordance with the illustrative embodiments. The pattern-generating process described in FIG. 4 allows a solution architect to identify reoccurring design patterns of artifacts which can be used to decrease the complexity and amount of time and effort required to develop a solution architecture design. The process described in FIG. 4 may be implemented in a solution design environment, such as solution design environment 300 in FIG. 3.

The process may begin with capturing business requirements that define the environment within which the solution patterns and transformation enablers will be created (step 402). The business requirements may be captured based on the needs of the business. The business requirements may be captured using various tools such as, for example, Rational RequisitePro® or Telelogic Doors®, or in document form. The SOA specification may then be derived from the captured business requirements (step 404). The SOA specification defines a business process and expected results of conducting an SOA practice that fulfills the objectives of the business. The artifacts in the SOA architecture model are chosen based on the business requirements.

Next, the process identifies a set of architectural artifacts associated with the SOA practice (step 406). A set of architectural artifacts may comprise one or more (a group of) architectural artifacts. The architectural artifacts are components or products of the SOA practice and are identified from the SOA specification. Architectural artifacts comprise the smallest architectural building blocks of a solution. At this point, the process may continue to steps 408, 410, or 412 as needed to define the architecture model. At step 408, the process identifies attributes and constraints of the architectural artifacts. Attributes and business constraints are associated with specific architectural artifacts to describe the unique features of that artifact. An attribute is a defined feature of an associated artifact. A business constraint is an external factor that forces or prevents an organization from pursuing particular approaches to meet its goals.

At step 410, the process then derives solution pattern rules for the artifacts. The solution pattern rules are derived to realize the transformation relationships or linkages between artifacts and which capture the attributes and business constraints of the artifacts. For example, one business constraint may state that candidate services shall be aligned to a specific business goal. A pattern rule may be derived that allows the user to transform a business goal artifact into a set of aligned candidate service artifacts. At step 412, transformation enabler rules are also derived, based on the SOA model and the method to be applied in building the architecture model.

Once the pattern and enabler rules are derived, the process generates solution design patterns and transformation enablers for the SOA practice (step 414). For example, in one embodiment, the pattern and enabler rules are encoded in a particular way, e.g., a graph structured model, and the pattern and transformation enablers read this structured model in order to determine what patterns and enablers are possible for the SOA practice.

FIG. 5 is a diagram of a model-pattern matching framework in accordance with the illustrative embodiments. The pattern matching framework in FIG. 5 illustrates a context-aware model-driven pattern enablement process used to achieve model specific pattern selection and enablement. (While a model-pattern matching framework is described in FIG. 5, it should be noted that the framework is also applicable to artifact-pattern matching and context-aware artifact-driven pattern enablement to achieve artifact specific pattern selection and enablement.) The model-driven pattern enablement provides a real-time binding of patterns and models for a solution to be quickly constructed. In addition, the model-driven pattern enablement provides traceability between models and patterns by recording the model-pattern matching and selection histories. Traceability is a technique for tracking, analyzing, and managing the impact an architectural artifact has on a solution architecture design.

Pattern matching framework 500 comprises various components, including models 502, patterns 504, validation module 506, enablement history repository 508, and pattern selection history 510. Models 502 are an example of model 302 in FIG. 3. Models 502 represent various types of SOA practices, such as, for example, business process models, services model, etc. Each model comprises a set of (one or more) architectural artifacts that are components or products of the SOA practice. When a model is selected by an architect, transformation enablers generated in FIG. 4 trigger an action to invoke the pattern selection and validation process.

Patterns 504 are an example of patterns 312 in FIG. 3. Patterns 504 represent a set of existing solution patterns for selection. Patterns 504 may include patterns generated from the process described in FIG. 4. The patterns are displayed in a graphical user interface to the architect, who may then select a subset of the existing patterns to apply to the selected model.

Validation module 506 is used to validate the model-pattern matching process. When an action is triggered upon selection of a model or set of (one or more) artifacts, validation module 506 receives the selected model as input and enables the patterns that are applicable to the selected model or artifacts. Validation module 506 validates/enables the patterns to make the pattern available for selection by the architect. For example, if the business process model is selected, patterns applicable to the selected business process model (e.g., patterns 1 and 2) are displayed in a manner distinct from the other patterns in the existing pattern list. To facilitate the model-pattern matching process, a model-pattern look up table is maintained in enablement history repository 508 to allow validation module 506 to determine which patterns are applicable to which models. The model-pattern look up table may be populated from the transformation relationships captured in the enablement history repository 508 and pattern selection history 510.

Enablement history repository 508 is a storage repository that is used to record the pattern enablement history for each model. The pattern enablement history comprises all of the patterns that were provided to the architect as selectable candidates to be applied to the model.

Pattern selection history 510 is an example of pattern selection history 310 in FIG. 3. Pattern selection history 510 comprises a subset of the patterns listed in enablement history repository 508 that were actually selected for each model. When a pattern or set of patterns are selected for a particular model, the selection of the patterns are recorded in the pattern selection history 510 and displayed to the architect. In one embodiment, the recorded solution design patterns for a solution design are ranked against each other according to how often a pattern is selected by the architects, as well as how applicable a pattern is to the model or set of architectural artifacts. For example, a popular (frequently selected) pattern will be ranked high in the pattern list displayed to an architect, and vice versa. If a pattern is determined to be more applicable to a set of artifacts, the pattern will be ranked higher than other patterns, and vice versa. Applicability of a pattern to a set of artifacts may be determined based on the type of the artifacts. By recording, ranking, and displaying the selected patterns, an architect may use the ranked patterns to revisit the solution design and determine which architectural artifacts are potentially affected by a changed requirement, as well as to determine how to modify an existing model that was created for another context to be reused in a new context. In the case where no existing patterns are applicable to an artifact, an experienced architect can manually populate the model by adding artifacts. Thus, if applicable patterns are available for a selected set of artifacts, the model may be populated with one or more architectural artifacts using an applicable solution design pattern. However, if no existing patterns are applicable to an artifact, the model may be populated with one or more architectural artifacts without using an applicable solution design pattern. Furthermore, a set of artifacts and their relationships can be highlighted and stored as a new pattern in the pattern repository. Such a pattern can then be validated by other architects based on the usage (selection and reuse) of the pattern. The recorded and ranked patterns may also be used to evolve the set of guidelines/best practices over time, which can lead to improvements to the design process. For example, if pattern selection history is traced over time, the solution architect may determine which patterns no longer seem to be useful, or correlate pattern selection with measurements from the solution implemented from the design to determine if particular patterns are especially useful.

Figure 6:
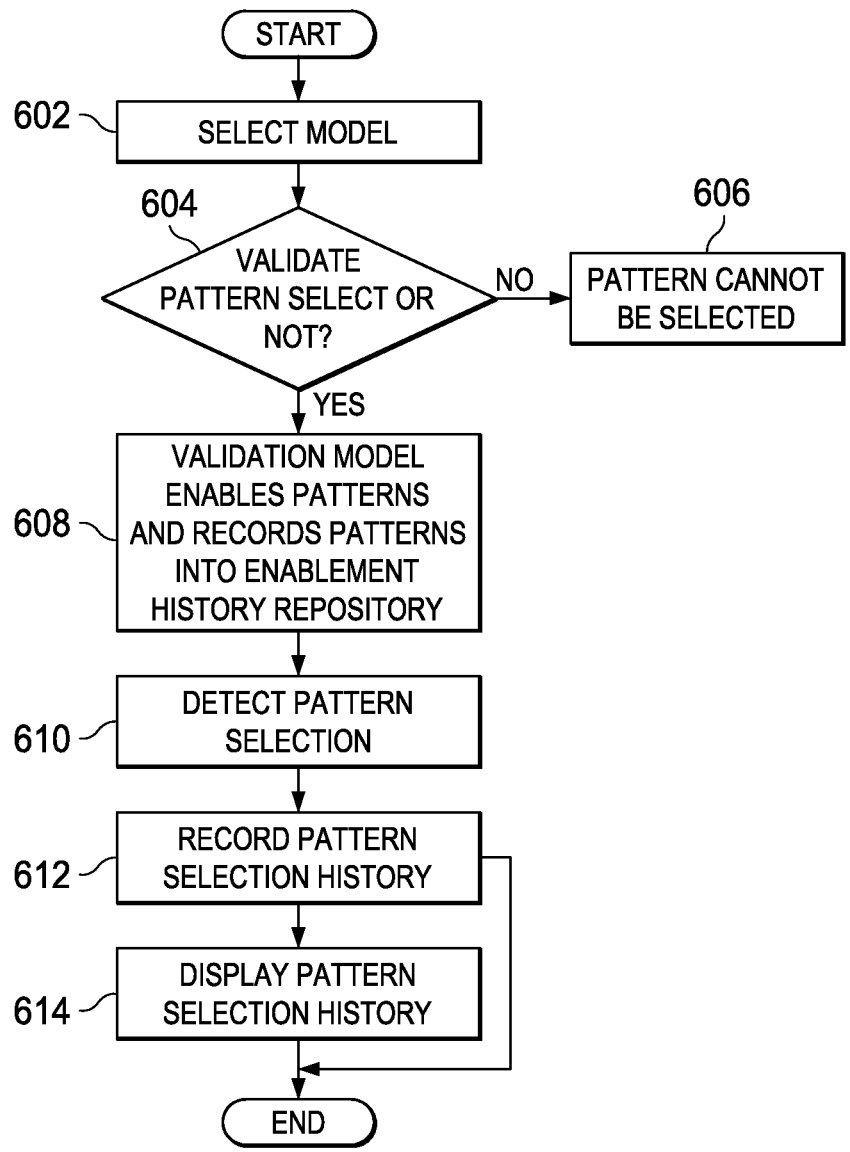
FIG. 6 is a flowchart of a process for selecting and applying patterns to models or artifacts in accordance with the illustrative embodiments.

FIG. 6 is a flowchart of a process for selecting and applying patterns to models or artifacts in accordance with the illustrative embodiments. Some patterns may be applied at the model-level, and other patterns may be applied to individual artifacts or groups of artifacts. The process described in FIG. 6 may be implemented in the pattern matching framework in FIG. 5. The process begins with the solution design environment detecting that the architect has selected a model or artifact (step 602). Upon selection of a model or artifact, a transformation enabler is used to trigger the pattern selection process for selecting and applying patterns to the selected model or artifact. The validation module accesses the model-pattern or artifact-pattern matching lookup table in the enablement history repository to determine whether a pattern is valid with respect to the selected model or artifact (step 604). A pattern is valid with respect to the selected model or artifact if a relationship between the pattern and the selected model or artifact exists in the model-pattern or artifact-pattern matching lookup table to indicate that the pattern is applicable to the selected model or artifact. If a pattern is determined to be invalid for the selected model or artifact ('no' output of step 604), the validation module determines that the pattern is not an applicable pattern for the selected model or artifact (step 606), and the process may return to step 604 to evaluate other existing patterns for validity. However, if the pattern is determined to be valid for the selected model or artifact ('yes' output of step 604), the validation module enables the pattern for user selection and records all of the patterns determined to be applicable candidates for applying to the selected model or artifact in the enablement history repository (step 608).

When the solution design environment detects that a pattern has been selected by an architect (step 610), the solution design environment records the selected pattern to the pattern selection history (step 612). The pattern selection history may then be displayed in a graphical user interface to the architect (step 612). The pattern selection history provides service oriented architecture model or artifact reusability information and traceability information to the architect. The traceability information may be used to modify guidelines and best practices in the solution design environment.

FIG. 7 is a diagram illustrating the flagging of artifact-pattern matches in accordance with the illustrative embodiments. As previously mentioned, an artifact is a basic building block or component of a solution architecture design, and a model comprises a set of architectural artifacts comprising components or products of an SOA practice. While patterns may be reused by matching and applying known patterns to models to facilitate design of an SOA solution, patterns are also matched and applied to architectural artifacts at a different conceptual level in the design. Model-level patterns apply to a broader, higher level of design, while the artifact-specific patterns tend to be more specific. Typically, a model-level pattern which specifies an overall design pattern will be applied first, and then artifact-level patterns will be applied to model the solution in greater detail. FIG. 7 illustrates an exemplary visualized view/graphical user interface in which an architect may view and select and apply patterns to artifacts. The interface shows what the applicable patterns are for a specific architectural artifact, as well as reduces ambiguity during SOA practices when patterns are applied. Through the visual interface, SOA architects may easily choose an applicable pattern to apply to a specific architectural artifact, while avoiding the possibility that a wrong pattern might be used. Artifact-pattern matches are 'flagged', meaning that attributes and/or the status of an artifact along one of the dimensions that is tracked by the system (e.g., artifact completion status, artifact origin, or guidelines applied) is displayed to the user.

In this illustrative example, architectural artifacts 702 are shown to comprise various artifacts 1 to n and patterns 704 are shown to comprise various patterns 1 to n. Selection of any of architectural artifacts 702 triggers the artifact-pattern-matching process in which the validation model 506 in FIG. 5 checks an artifact-pattern matching table in the enablement history repository to determine which patterns are applicable to the selected architectural artifact. In this example, for artifact 1, the patterns shown as being applicable or recommended to artifact 1 are patterns 1 and 3. In one embodiment, these applicable patterns may be flagged by color-coding the patterns and displaying them to the architect for selection. For example, the applicable patterns may be highlighted in a particular color, while the other patterns remain grey as not selectable.

FIG. 8 is a diagram illustrating source flagging of architectural artifacts in accordance with the illustrative embodiments. Geometric shape indicators may be used in the visual interface to categorize architectural artifacts according to the source from which the artifact was derived. For example, in the SOA solution design environment, there are primarily three categories of architectural artifacts based on where the artifact is derived: pattern-created artifact, external artifact, and implemented artifact. Pattern-created artifact shape 802 may be used to represent an architectural artifact that is generated by applying patterns. External artifact shape 804 may be used to represent an architectural artifact that is imported from other resources such as business process analysis results. Existing artifact 806 may be used to represent an architectural artifact that is an existing SOA component and is currently realized and implemented.

In the visual view/graphical user interface, different shapes may be used as visualizations of the architectural artifacts from different sources. Additional shapes may be implemented as other source categories are applicable. For instance, a design artifact shape may be included to represent an architectural artifact that is supplied through a design that has not yet been realized. The shape indicator provides a clear way to show the sources from which an architectural artifact is derived. The source of an artifact may be important when selecting a pattern if the pattern depends on the source of the artifact being from a particular input. Knowledge of the source of an artifact also assists in determining the traceability of the different artifacts.

Figures 9, 10:
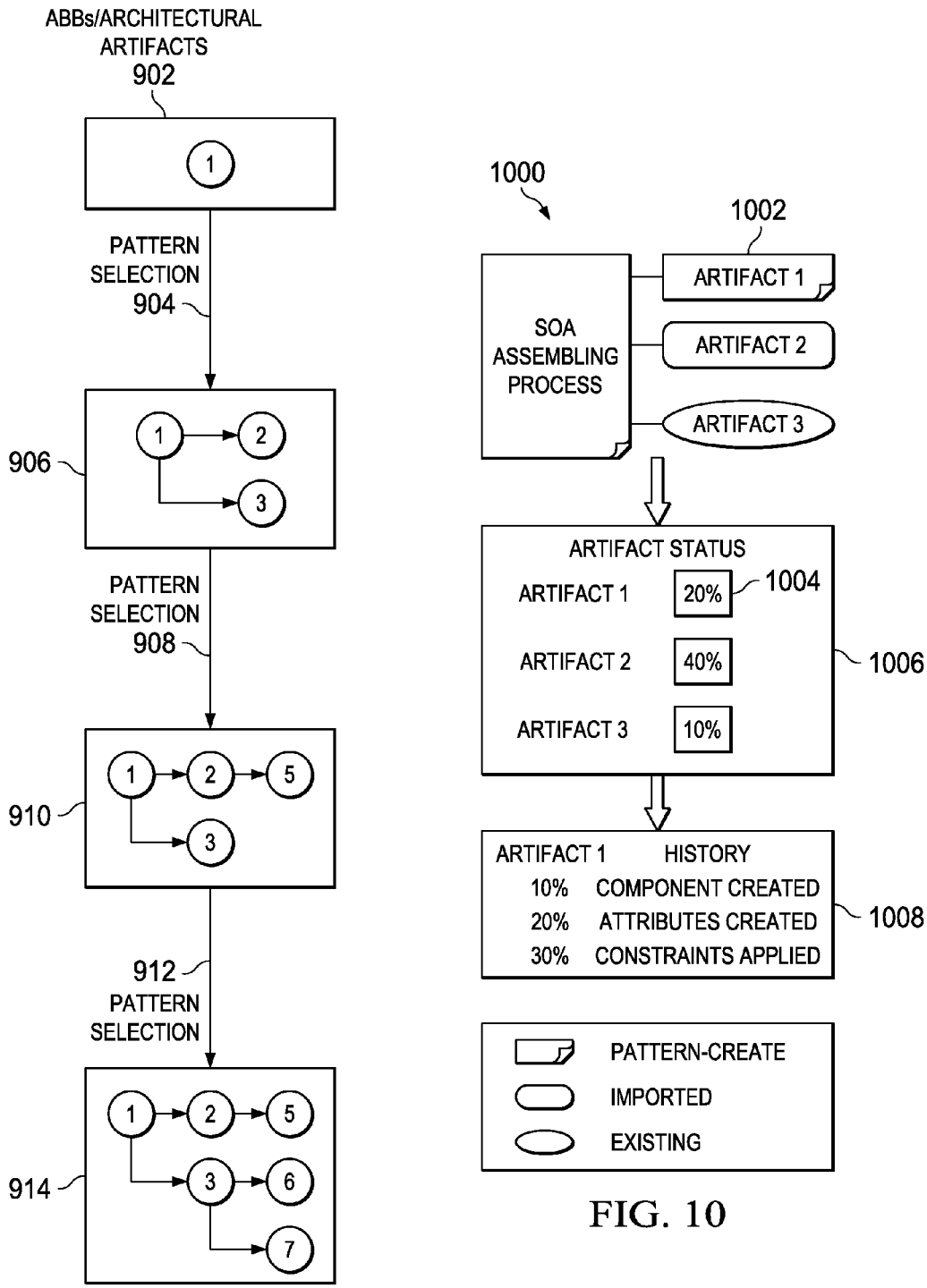
FIG. 9 is a diagram illustrating model population through cascading steps of applying architecture patterns in accordance with the illustrative embodiments.
FIG. 10 is an exemplary architectural artifact creation history view in accordance with the illustrative embodiments.

FIG. 9 is a diagram illustrating model population through cascading steps of applying architecture patterns in accordance with the illustrative embodiments. When a particular architecture building block 902 is selected, one or more patterns that are applicable to the particular architecture building block, based on the type or attributes of the architecture building block, are displayed to the architect for selection. Selection of a pattern is used to apply the pattern to the architecture building block. Patterns are applied to different architecture building blocks to assist in making architecture decisions when building the solution. As one or more patterns are selected for an architecture building block and applied 904 to the architecture building block 902 instance, other architecture building blocks 906 are created that have a transformation relationship tracing back to the original architecture building block. When one or more patterns are selected and applied 908 to the architecture building block 906 instances, additional architecture building blocks 910 are created that have a transformation relationship tracing back to the original architecture building block. This cascading process may continue, as patterns are selected and applied 912 to the architecture building block 910 instances which create additional architecture building blocks 914, thereby providing new patterns that may be applicable to architecture building blocks 914. Thus, as the architecture solution is being created, the cascading steps refer to the fact that selection of a particular pattern leads to a state where other architecture patterns become applicable in building the solution, and selection of one of those patterns to apply to the architecture building blocks in one state lead to a new state where a different set of patterns are applicable, and so on.

Figures 11, 12:
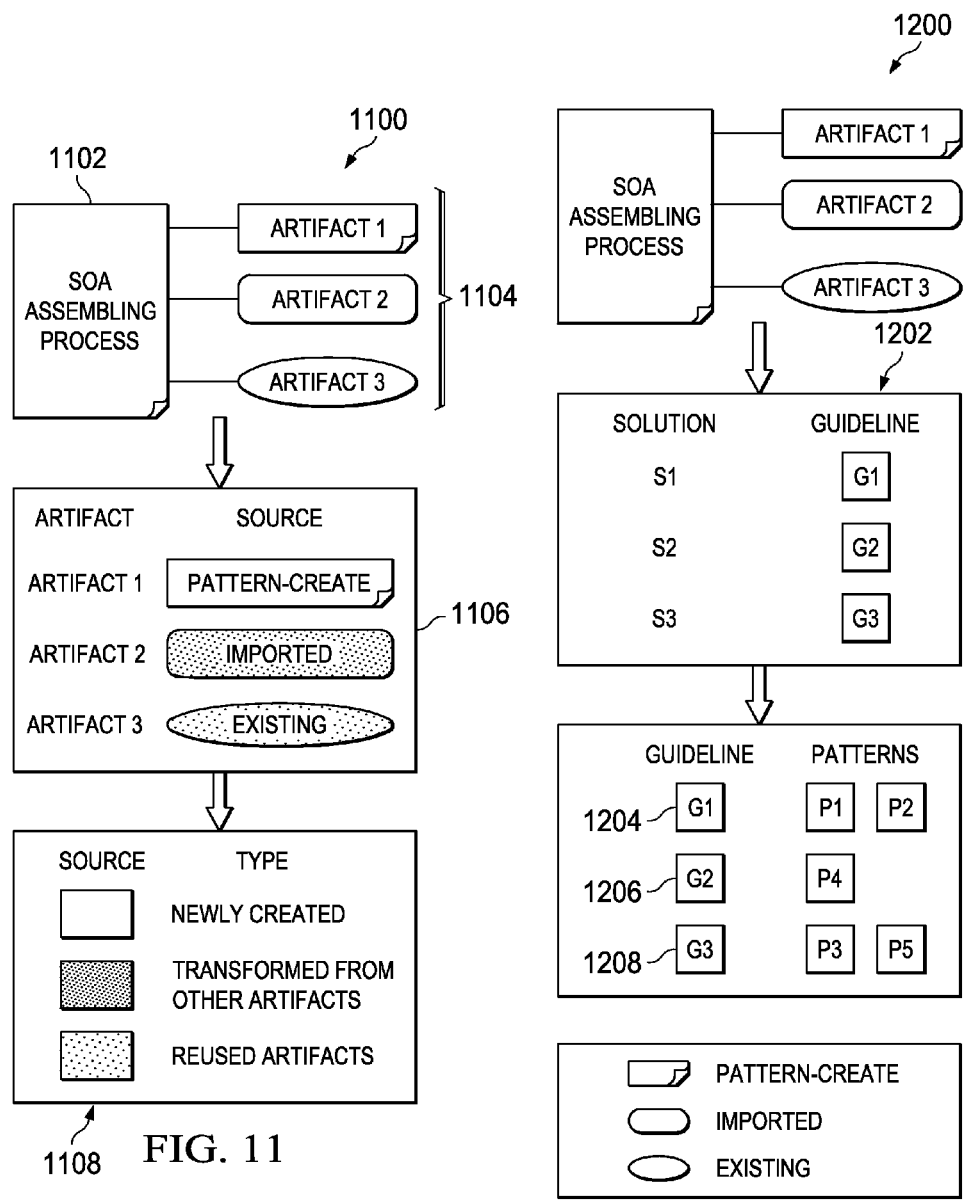
FIG. 11 is an exemplary architectural artifact profile view in accordance with the illustrative embodiments.
FIG. 12 is an exemplary architectural artifact compliance view in accordance with the illustrative embodiments.

FIGS. 10-12 illustrate a set of views that provide enriched information for SOA practitioners during the realization of the multi-dimensional cascading flagging process. The multi-dimensional views comprise an individual artifact view, a profile view, and a compliance view to produce a mapping and transformation history. The multi-dimensional views provide the capability of visualizing artifacts and facilitating impact analysis on the solution design via tracing change propagation path. The multi-dimensional cascading views also allow for identifying problems in the solution design, estimating completion of a process, and verifying compliance to a set of architectural guidelines. These views may be invoked by the user at any time during the solution design process.

FIG. 10 is an exemplary architectural artifact creation history view in accordance with the illustrative embodiments. Individual artifact view 1000 is triggered when a single artifact history needs to be displayed. The triggering path is displayed to the architect in a highlighted manner. For every architectural artifact, such as artifact 1002, its creation status 1004 is recorded as a percentage and displayed when a specific artifact is selected. The status of an architectural artifact indicates how much work has been done to create or manipulate a specific architectural artifact. A status table 1006 is maintained to record the status changes of architectural artifacts. If an architectural artifact's status is changed, the corresponding entry of status table 1006 is updated. A status tag is attached to every architectural artifact to show current status.

To flag the status of an architectural artifact, a percentage is used to measure the degree of completion. For example, artifact 1 is attached a tag of "20%", that means, 80% to completion. Other measurement scales can be used based on the specific needs of different SOA practices. Status flagging provides a way to estimate the workload during SOA practices thus a real-time work schedule re-planning can be conducted.

Upon selecting the status percentage in status table 1006, creation history table 1008 is displayed to show the current creation stage of the specific artifact. The cascading of individual artifact status (e.g., artifact 1002) in status table 1006 and creation history in creation history table 108 provides a reference for an SOA practitioner to estimate the workload of the remaining artifact design. The workload estimation may provide linkages to other project management plans. Also, the change propagation path in creation history table 1008 can be traced to reveal to what extent a change affects an artifact under investigation.

FIG. 11 is an exemplary architectural artifact profile view in accordance with the illustrative embodiments. The cascading profile view provides a traceable path of artifact creation from source to end-product, and captures the cascaded patterns and transformation enablers that have been applied to the models or artifacts when building the solution. Thus, source validation can be carried along the creation path to ensure that architectural artifacts are created from the predefined source and intermediate transformations. Profile view 1100 is triggered when a business process, such as SOA assembling process 1102, is selected. The triggering path is displayed to the architect in a highlighted manner. When a business process is selected, the corresponding architectural artifacts 1104 are displayed. An associated artifact-source table 1106 is shown to reveal the source from where a specific artifact (e.g., artifact 1) was derived. For every source, a type is attached in source-type table 1108 to show the derivation path of the artifact.

For example, artifact-source table 1106 shows that artifact 1 is created by applying patterns, artifact 2 is imported from results of other business processes, and artifact 3 is an existing asset. For each source, a color tag may be used to show the derivation path (type) of an artifact. For example, yellow may be used to indicate the artifact is newly created, green may be used to indicate the artifact is transformed from another artifact, and grey may be used to indicate the artifact is reused.

FIG. 12 is an exemplary architectural artifact compliance view in accordance with the illustrative embodiments. Since each pattern records its conformance to architectural guidelines, it is possible to verify whether a particular model can be determined to conform to a chosen set of guidelines by examining the patterns that have been applied to the model, and checking their compliance to selected guidelines using pattern-guideline correlation table 1202. In this way, the task of certifying compliance is simplified. Additionally, compliance status gives another indication of the progress of the solution.

Compliance view 1200 is trigged when an SOA solution's compliance to a set of guidelines needs to be determined. Compliance view 1200 illustrates the selected set of guidelines that must be followed by the solution, with an associated color for each guideline in pattern-guideline correlation table 1202 which indicates the compliance of the solution to that particular guideline. Guidelines for which compliance is verified because a particular pattern or patterns have been applied are highlighted in a first color (e.g., guidelines 1204), and the patterns for which compliance has been manually certified by the practitioner may be displayed in a second color (e.g., guidelines 1206). A third color may be used to indicate guidelines (e.g., guidelines 1208) for which the compliance is unknown. The compliance of the solution can be traced to the individual artifacts which are relevant to the compliance scenarios for the highlighted guidelines in the first and second colors.

Figure 15:
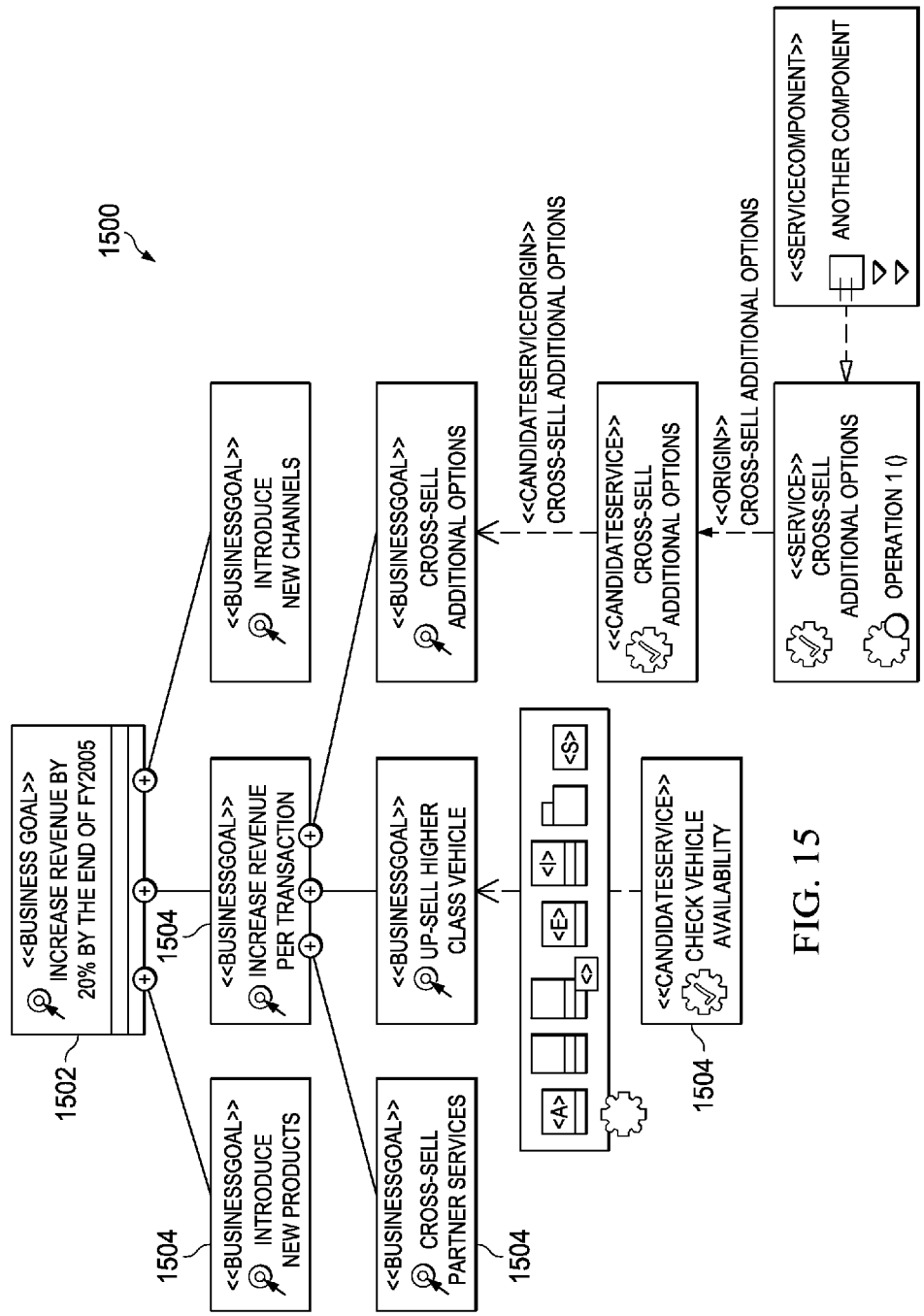
FIG. 15 illustrates an exemplary direct impact diagram in accordance with the illustrative embodiments.

FIGS. 13-15 illustrate one embodiment of traceability enablement through domain-specific impact analysis patterns. While the traceability enablement is described in these examples in terms of an impact analysis pattern, it should be noted that the same impact analysis technique may be used to support other analytic analyses to improve the design quality of an SOA solution design. For an architect, an impact analysis is a graphical user interface display of certain portion of a solution design related to a specific artifact under investigation. An SOA solution design may be represented as a graph with nodes presenting architecture building blocks and edges (or links) representing relationships among nodes. Therefore, the impact analysis of a given architecture building block is mathematically defined as to compute a sub-graph of a design using the given architecture building block as input. Unfortunately, a design model for a real industry application may be very large and complex with several thousand architecture building blocks. The impact of an architecture building block (artifact) may be complex when considering the direct and indirect relationships through other architecture building blocks. The illustrative embodiment enables an architect to select only those architecture building blocks and relationships that impact the architecture building block under analysis.

The impact of an architecture building block can be defined as direct or indirect. A direct impact analysis pattern of a given architecture building block is created as a diagram that contains only those directly impacted (offspring) architecture building blocks (and corresponding links) that can be traced back to the given architecture building block with the given architecture building block as the only root node. The direct impact analysis is used to track the implementation of an architecture building block, which can tell how the architecture building block is progressively realized. An indirect impact analysis pattern of a given architecture building block is created as a diagram that contains only those indirectly impacted (ancestor) architecture building blocks (and corresponding links) that can be traced back from the given architecture building block with the given architecture building block as the only leaf node. The indirect impact analysis is used to find out how an architecture building block is identified from and aligned with business requirements through bottom-up analysis.

The enablement of the impact analysis patterns and solution architecture building blocks is configurable. FIG. 13 illustrates an encoding of patterns in the form of impact analysis configuration file 1300 which define the impact scope of an architecture building block for an SOA solution model. Configuration file 1300 defines the impact analysis starting point (a stereotype name) and ending point (another stereotype name) for an SOA solution model. Relevant relationships between stereotypes are selected using the configuration file. By using the configuration file, parts of the architecture model may be filtered out by setting the starting point and ending point of the analysis and the relationships among the architecture building blocks of the model. Configuration file 1300 may be used in an end-to-end impact analysis. Configuration file 1300 comprises the stereotypes to be analyzed as defined by the IMPACT values 1302, the selections of the starting points of the analysis as defined by the values of IMPACT.Indirect.Leaf 1304, and the selections of the ending points of the analysis as defined by the values of IMPACT.Direct.Leaf 1306. The remaining part (main body 1308) of configuration file 1300 defines the relationships needed to complete the impact analysis.

FIG. 14 illustrates a graphical representation of configuration file 1300 in FIG. 13. FIG. 14 is provided to build the context-aware relationship among SOA solution architecture building blocks. Completion analysis may be accomplished using some kind of visual indicator, such as color coding. For a direct impact analysis pattern, the leaf node must have the ending point stereotype defined in the configuration file. If the ending point is not defined, the leaf node will be visually marked to notify the architect that the model is not complete. For an indirect impact analysis pattern, the root nodes must have one of the stereotypes defined as the starting point. If the starting point is not defined, the root nodes without proper stereotypes will be visually marked to notify the architect.

FIG. 15 illustrates an exemplary direct impact diagram 1500 for a <<BusinessGoal>> architecture building block 1502. Architecture building blocks in the direct impact diagram reflect the completion status of the model. In impact diagrams, certain visual markers may be applied to architecture building blocks to notify an architect that the marked architecture building blocks may have problems or require attention in the design. For example, architecture building blocks that are visually marked 1504 indicate that these parts of the model are incomplete. It is noted that the same impact analysis technique can be used to support other analytic analysis to improve the design quality of an SOA solution.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the disclosure has been presented for purposes of illustration and description, but is not intended to be exhaustive or limited to the embodiments of the disclosure in the forms disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The embodiments of the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the embodiments of the disclosure can take the form of a computer program product accessible from a computer readable medium providing program code for use by or in connection with a computer or any instruction execution system. For the purposes of this description, a computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the embodiments of the disclosure has been presented for purposes of illustration and description, and is not intended to be exhaustive or limited to the embodiments of the disclosure in the forms disclosed. Many modifications and variations will be apparent to those of ordinary skill in the art. The embodiments were chosen and described in order to best explain the principles of the disclosure, the practical application, and to enable others of ordinary skill in the art to understand the disclosure for various embodiments with various modifications as are suited to the particular use contemplated.

What is claimed is:

1. A computer implemented method for configuring solution design patterns in a service oriented architecture environment, the computer implemented method comprising:

capturing, by a computer, a set of business requirements that define a solution design environment;

deriving, by the computer, a service oriented architecture specification from the captured set of business requirements, wherein the service oriented architecture specification defines service oriented architecture practices that achieve a set of business objectives in accordance with the set of business requirements;

obtaining, by the computer, a set of architectural artifacts from the service oriented architecture specification, wherein the computer categorizes each architectural artifact in the set of architectural artifacts in a graphical user interface according to a source from which each architectural artifact is derived using a plurality of different geometric shape indicators that includes a first geometric shape indicating a new pattern-generated architectural artifact, a second geometric shape indicating an imported architectural artifact, and a third geometric shape indicating an existing architectural artifact;

determining, by the computer, attributes and constraints of the set of architectural artifacts;

deriving, by the computer, solution design pattern rules that define transformation relationships among the set of architectural artifacts and define the attributes and business constraints of the set of architectural artifacts;

generating, by the computer, solution design patterns applicable to a design solution based on the solution design pattern rules;

deriving, by the computer, transformation rules that transform the set of architectural artifacts to another set of architectural artifacts applicable to the design solution;

generating, by the computer, transformation enablers applicable to the design solution based on the transformation rules;

displaying, by the computer, the set of architectural artifacts within the graphical user interface using the plurality of different geometric shape indicators to indicate the source from which each architectural artifact is derived including the first geometric shape indicating the new pattern-generated architectural artifact, the second geometric shape indicating the imported architectural artifact, and the third geometric shape indicating the existing architectural artifact;

displaying, by the computer, a completion status percentage of a selected architectural artifact within the graphical user interface that is a measure of a degree of completion of the selected architectural artifact, wherein a status tag is attached to each of the set of architectural artifacts to indicate the completion status percentage; and responsive to the computer detecting a selection of an architecture model, triggering, by the computer, a solution design process, wherein the solution design process includes:

accessing, by the computer, a model-pattern matching lookup table to determine which of the generated solution design patterns are valid candidates for the selected architecture model;

responsive to the computer determining solution design patterns that are valid candidates for the selected architecture model using the model-pattern matching lookup table, enabling, by the computer, the solution design patterns that are valid candidates for the selected architecture model for selection in a list of the generated solution design patterns;

responsive to the computer enabling the solution design patterns that are valid candidates for the selected architecture model for selection in the list of the generated solution design patterns, recording, by the computer, valid solution design pattern candidates for the selected architecture model in an enablement history repository;

displaying, by the computer, the valid solution design pattern candidates that are enabled for selection in the list of the generated solution design patterns within the graphical user interface distinct from other generated solution design patterns in the list;

populating, by the computer, the selected architectural model with architectural artifacts corresponding to selected valid solution design pattern candidates; and responsive to the computer determining that there are no solution design patterns that are valid candidates for the selected architecture model using the model-pattern matching lookup table, populating, by the computer, the selected architecture model with one or more architectural artifacts without using a valid solution design pattern.

2. The computer implemented method of claim 1, wherein the solution design process further includes:

responsive to the computer detecting a selection of a solution design pattern in the valid solution design pattern candidates for the selected architecture model, recording, by the computer, the selection of the solution design pattern in a pattern selection history for the selected architecture model that is a selected subset of all solution design patterns listed in the enablement history repository; and displaying, by the computer, the pattern selection history for the architecture model in the graphical user interface.

3. The computer implemented method of claim 2, wherein recording the selected solution design pattern in a pattern selection history provides traceability information.

4. The computer implemented method of claim 3, wherein the traceability information is used to modify guidelines and best practices in the solution design environment.

5. The computer implemented method of claim 2, wherein recording the selected solution design pattern in a pattern selection history provides architecture model or artifact reusability information.

6. The computer implemented method of claim 2, wherein the graphical user interface in the displaying, by the computer, of the pattern selection history for the architecture model in the graphical user interface comprises multi-dimensional cascading views of the set of architectural artifacts, and wherein the multi-dimensional cascading views allow for identifying problems in the solution design, estimating completion of a process, analyzing an impact of a change to the set of architectural artifacts on the solution design, and verifying compliance to a set of architectural guidelines.

7. The computer implemented method of claim 1, further comprising:

responsive to the computer determining that there are no solution design patterns that are valid candidates for the selected architecture model, generating, by the computer, a new solution design pattern that is applicable to candidates for the selected architecture model;

storing, by the computer, the new solution design pattern in a pattern repository; and validating, by the computer, the new solution design pattern.

8. The computer implemented method of claim 1, wherein determining which solution design patterns are valid candidates for the selected architecture model comprises accessing the model-pattern matching lookup table in the enablement history repository to identify patterns matching the selected architecture model.

9. The computer implemented method of claim 1, wherein the transformation enablers comprise selectable menu items in the graphical user interface and are applied to the set of architectural artifacts to transform the set of architectural artifacts to the another set of architectural artifacts.

10. The computer implemented method of claim 1, wherein the determining, by the computer, the solution design patterns that are valid candidates for the selected architecture model further includes triggering the transformation enablers to apply to the set of architectural artifacts.

11. The computer implemented method of claim 1, wherein the transformation relationships among the set of architectural artifacts are created based on an impact of the set of architectural artifacts on the solution design.

12. The computer implemented method of claim 1, further comprising:

providing, by the computer, a service oriented architecture consulting service to a customer comprising the solution design patterns and transformation enablers to facilitate solution design support.

13. The computer implemented method of claim 1, wherein the displaying, by the computer, the valid solution design pattern candidates that are enabled for selection in the list of the generated solution design patterns within the graphical user interface distinct from other generated solution design patterns in the list allows selection of one or more solution design pattern candidates to apply to the selected architecture model.

14. A computer system for configuring solution design patterns in a service oriented architecture environment, the computer system comprising:
a bus;
a non-transitory storage device connected to the bus, wherein the non-transitory storage device stores computer usable code; and
a processor connected to the bus, wherein the processor executes the computer usable code to capture a set of business requirements that define a solution design environment; derive a service oriented architecture specification from the captured set of business requirements, wherein the service oriented architecture specification defines service oriented architecture practices that achieve a set of business objectives in accordance with the set of business requirements; obtain a set of architectural artifacts from the service oriented architecture specification, wherein each architectural artifact in the set of architectural artifacts is categorized in a graphical user interface according to a source from which each architectural artifact is derived using a plurality of different geometric shape indicators that includes a first geometric shape indicating a new pattern-generated architectural artifact, a second geometric shape indicating an imported architectural artifact, and a third geometric shape indicating an existing architectural artifact; determine attributes and constraints of the set of architectural artifacts; derive solution design pattern rules that define transformation relationships among the set of architectural artifacts and define the attributes and business constraints of the set of architectural artifacts; generate solution design patterns applicable to a design solution based on the solution design pattern rules; derive transformation rules that transform the set of architectural artifacts to another set of architectural artifacts applicable to the design solution; generate transformation enablers applicable to the design solution based on the transformation rules; display the set of architectural artifacts within the graphical user interface using the plurality of different geometric shape indicators to indicate the source from which each architectural artifact is derived including the first geometric shape indicating the new pattern-generated architectural artifact, the second geometric shape indicating the imported architectural artifact, and the third geometric shape indicating the existing architectural artifact; display a completion status percentage of a selected architectural artifact within the graphical user interface that is a measure of a degree of completion of the selected architectural artifact, wherein a status tag is attached to each of the set of architectural artifacts to indicate the completion status percentage; and trigger a solution design process in response to detecting a selection of an architecture models, wherein the solution design process includes:
accessing a model-pattern matching lookup table to determine which of the generated solution design patterns are valid candidates for the selected architecture model; enabling the solution design patterns that are valid candidates for the selected architecture model for selection in a list of the generated solution design patterns in response to determining solution design patterns that are valid candidates for the selected architecture model using the model-pattern matching lookup table; recording valid solution design pattern candidates for the selected architecture model in an enablement history repository in response to enabling the solution design patterns that are valid candidates for the selected architecture model for selection in the list of the generated solution design patterns; displaying the valid solution design pattern candidates that are enabled for selection in the list of the generated solution design patterns within the graphical user interface distinct from other generated solution design patterns in the list; populating the selected architectural model with architectural artifacts corresponding to selected valid solution design pattern candidates; and populating the selected architecture model with one or more architectural artifacts without using a valid solution design pattern in response to the computer determining that there are no solution design patterns that are valid candidates for the selected architecture model using the model-pattern matching lookup table.

15. A computer program product stored on a non-transitory computer readable storage device having computer readable program code embodied thereon that is executable by a computer for configuring solution design patterns in a service oriented architecture environment, the computer program product comprising:
computer readable program code for capturing a set of business requirements that define a solution design environment;
computer readable program code for deriving a service oriented architecture specification from the captured set of business requirements, wherein the service oriented architecture specification defines service oriented architecture practices that achieve a set of business objectives in accordance with the set of business requirements;
computer readable program code for obtaining a set of architectural artifacts from the service oriented architecture specification, wherein each architectural artifact in the set of architectural artifacts is categorized in a graphical user interface according to a source from which each architectural artifact is derived using a plurality of different geometric shape indicators that includes a first geometric shape indicating a new pattern-generated architectural artifact, a second geometric shape indicating an imported architectural artifact, and a third geometric shape indicating an existing architectural artifact;
computer readable program code for determining attributes and constraints of the set of architectural artifacts;
computer readable program code for deriving solution design pattern rules that define transformation relationships among the set of architectural artifacts and define the attributes and business constraints of the set of architectural artifacts;
computer readable program code for generating solution design patterns applicable to a design solution based on the solution design pattern rules;
computer readable program code for deriving transformation rules that transform the set of architectural artifacts to another set of architectural artifacts applicable to the design solution;

computer readable program code for generating transformation enablers applicable to the design solution based on the transformation rules;

computer readable program code for displaying the set of architectural artifacts within the graphical user interface using the plurality of different geometric shape indicators to indicate the source from which each architectural artifact is derived including the first geometric shape indicating the new pattern-generated architectural artifact, the second geometric shape indicating the imported architectural artifact, and the third geometric shape indicating the existing architectural artifact;

computer readable program code for displaying a completion status percentage of a selected architectural artifact within the graphical user interface that is a measure of a degree of completion of the selected architectural artifact, wherein a status tag is attached to each of the set of architectural artifacts to indicate the completion status percentage; and computer readable program code for triggering a solution design process in response to detecting a selection of an architecture model, wherein the solution design process includes:

computer readable program code for accessing a model-pattern matching lookup table to determine which of the generated solution design patterns are valid candidates for the selected architecture model;

computer readable program code for enabling the solution design patterns that are valid candidates for the selected architecture model for selection in a list of the generated solution design patterns in response to determining solution design patterns that are valid candidates for the selected architecture model using the model-pattern matching lookup table;

computer readable program code for recording valid solution design pattern candidates for the selected architecture model in an enablement history repository in response to enabling the solution design patterns that are valid candidates for the selected architecture model for selection in the list of the generated solution design patterns;

computer readable program code for displaying the valid solution design pattern candidates that are enabled for selection in the list of the generated solution design patterns within the graphical user interface distinct from other generated solution design patterns in the list;

computer readable program code for populating the selected architectural model with architectural artifacts corresponding to selected valid solution design pattern candidates; and computer readable program code for populating the selected architecture model with one or more architectural artifacts without using a valid solution design pattern in response to determining that there are no solution design patterns that are valid candidates for the selected architecture model using the model-pattern matching lookup table.

* * * * *